Nov. 11, 1958 H. BLACKSTONE 2,860,179
VIDEO-DISPLAY DEVICES
Filed Nov. 25, 1953 3 Sheets-Sheet 1
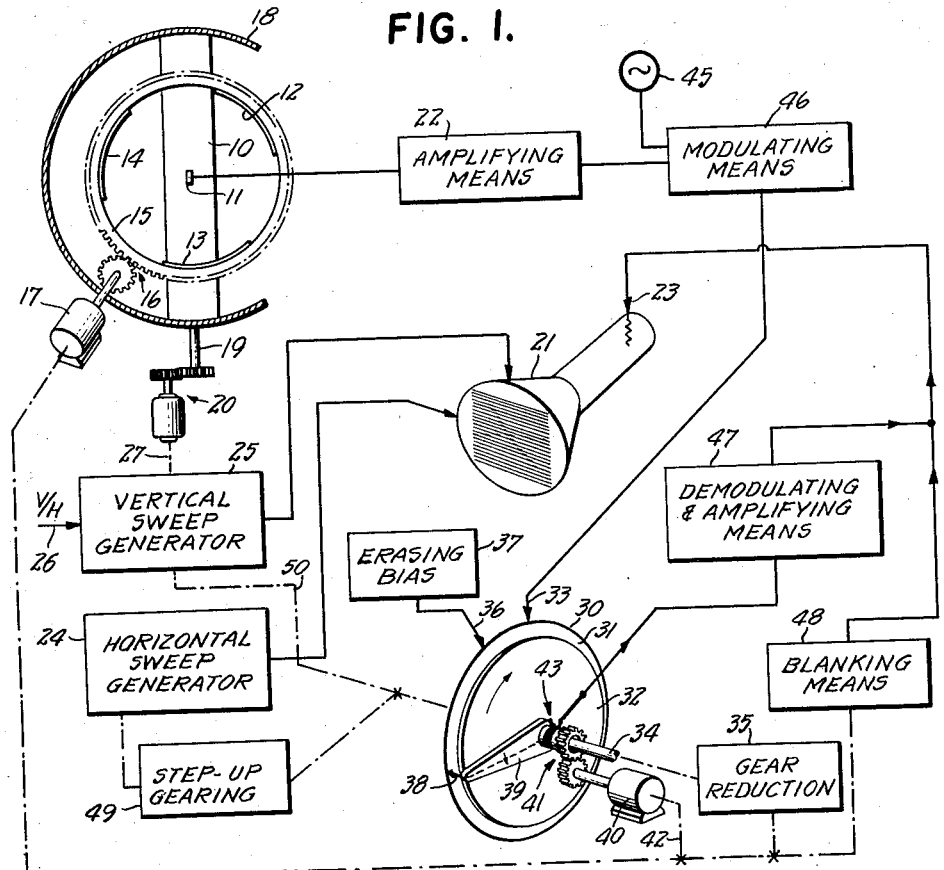
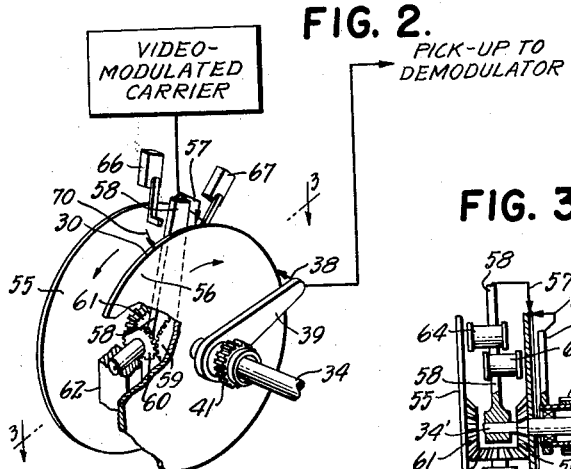
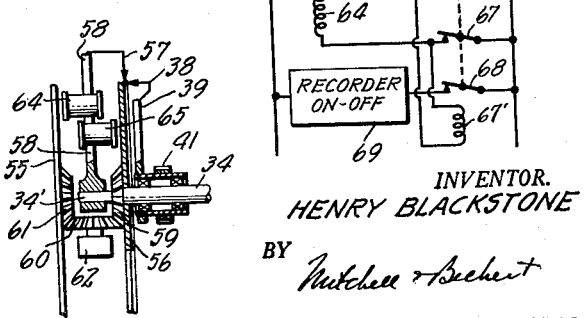
INVENTOR.
HENRY BLACKSTONE
BY
ATTORNEYS Nov. 11, 1958

H. BLACKSTONE 2,860,179

VIDEO-DISPLAY DEVICES

Filed Nov. 25, 1953

INVENTOR.
HENRY BLACKSTONE
BY *Mitchell & Bechert*

ATTORNEYS

Nov. 11, 1958 H. BLACKSTONE 2,860,179
VIDEO-DISPLAY DEVICES
Filed Nov. 25, 1953 3 Sheets-Sheet 3
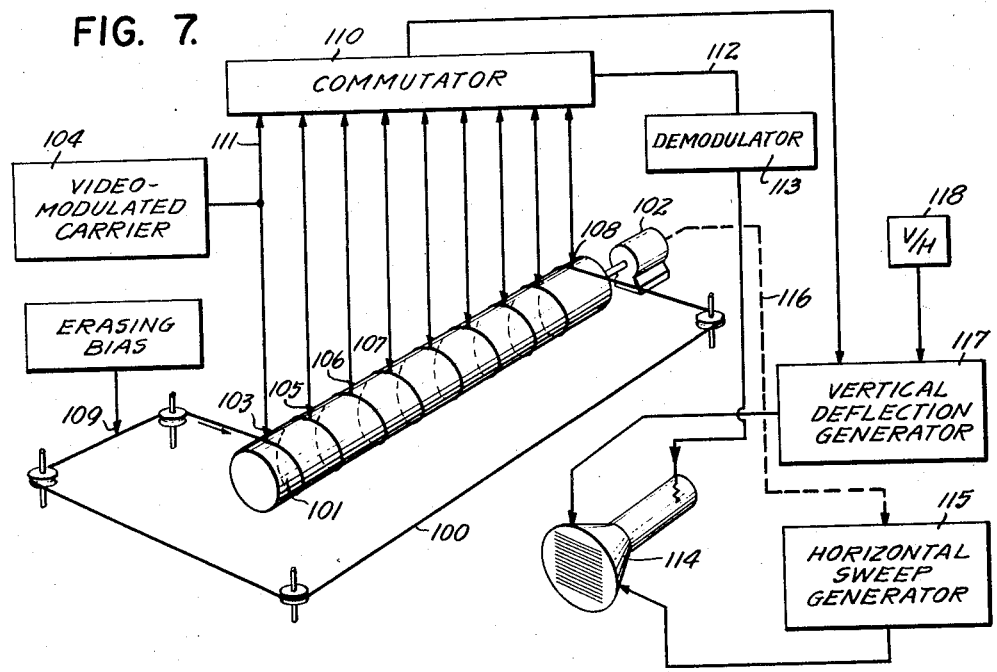
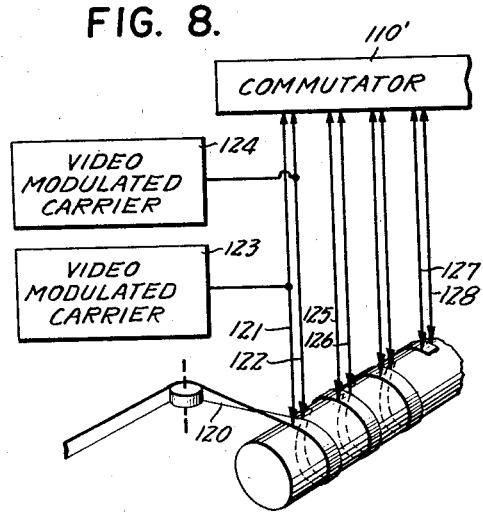
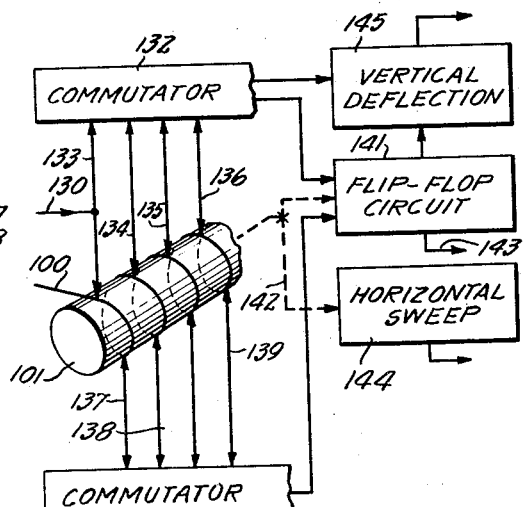
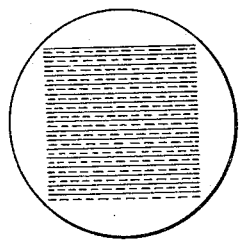
INVENTOR
HENRY BLACKSTONE
BY *Mitchell & Bechert*
ATTORNEYS United States Patent Office 2,860,179
Patented Nov. 11, 1958

2,860,179

VIDEO-DISPLAY DEVICES

Henry Blackstone, Eaton's Neck, Northport, N. Y., assignor to Servo Corporation of America, Hyde Park, N. Y., a corporation of New York Application November 25, 1953, Serial No. 394,346

22 Claims. (Cl. 178—6.6)

My invention relates to automatic scanning mechanisms for continuously scanning a field of view and, in particular, to those in which the intelligence from a plurality of successively scanned lines in said field is to be integrated into a frame. The present invention is in the nature of an improvement over that disclosed in the copending application of Henry Blackstone and Frank G. Willey, Serial No. 320,272, filed November 13, 1952.

In scanning mechanisms of the class described in said copending application, the number of lines of scanned intelligence available at a time is limited by the number of sensitive elements, and if the intelligence is to be instantaneously available as a frame of successive lines, then one must either make a permanent record of all scanned lines, as on a moving film or moving paper-strip record, or one must employ a long-persistence device, such as a cathode-ray oscillograph, to develop a full frame of intelligence and to hold such frame for interpretation. In the latter case, the frame presentation must be periodically indexed because, to develop the frame, one component of beam deflection, i. e. that transverse to the scan-line presentation must be depressed and, of course, this depression will ultimately progress off the face of the oscillograph. This periodic indexing of frames presents a serious handicap to the interpretation of the scanned information.

It is, accordingly, an object of my invention to provide an improved display means for scanners of the character indicated.

It is another object to provide an energy-storing device in combination with scanners of the character indicated, and capable of storing at all times the video intelligence developed by the scanner over a given plurality of most recent line scans, whereby the stored information may be available for effectively continuous display about a reference that is always based on the currently scanned intelligence.

More specifically, it is an object to provide an energy-storing device for storing an entire frame of intelligence and including means for continuously scanning this frame at a high rate, said frame always representing the most recent current frame of intelligence.

For one specific application of the invention, it is an object to provide an improved aerial-reconnaissance device utilizing a continuously rotating line-scanner and a storage device, and so displaying the stored information as to present the appearance of a window aligned with the axis of the scanner, with the scanned field migrating across the display as the aircraft covers the terrain beneath.

Another specific object is to meet the above objects with a storage device which may utilize the full storage potentialities thereof, in spite of any inherent limitations of the scanner with respect to directly utilizable vs. dead-time portions of its cycle.

Other objects and various further features of novelty and invention will be pointed out or will occur to those skilled in the art from a reading of the following specification, in conjunction with the accompanying drawings. In said drawings, which show, for illustrative purposes only, preferred forms of the invention:

Fig. 1 is an electrical block diagram schematically indicating component parts of a scanner and storing mechanism incorporating features of the invention;

Fig. 2 is a view in perspective and partly broken away to reveal a modified storage device for use as an alternative for certain elements of Fig. 1;

Fig. 3 is a fragmentary sectional view of parts shown in Fig. 2, the section being taken substantially in the plane 3—3 of Fig. 2;

Fig. 4 is a simplified electrical-control diagram illustrating a coordination of functions in the storage device of Figs. 2 and 3;

Figure 5:
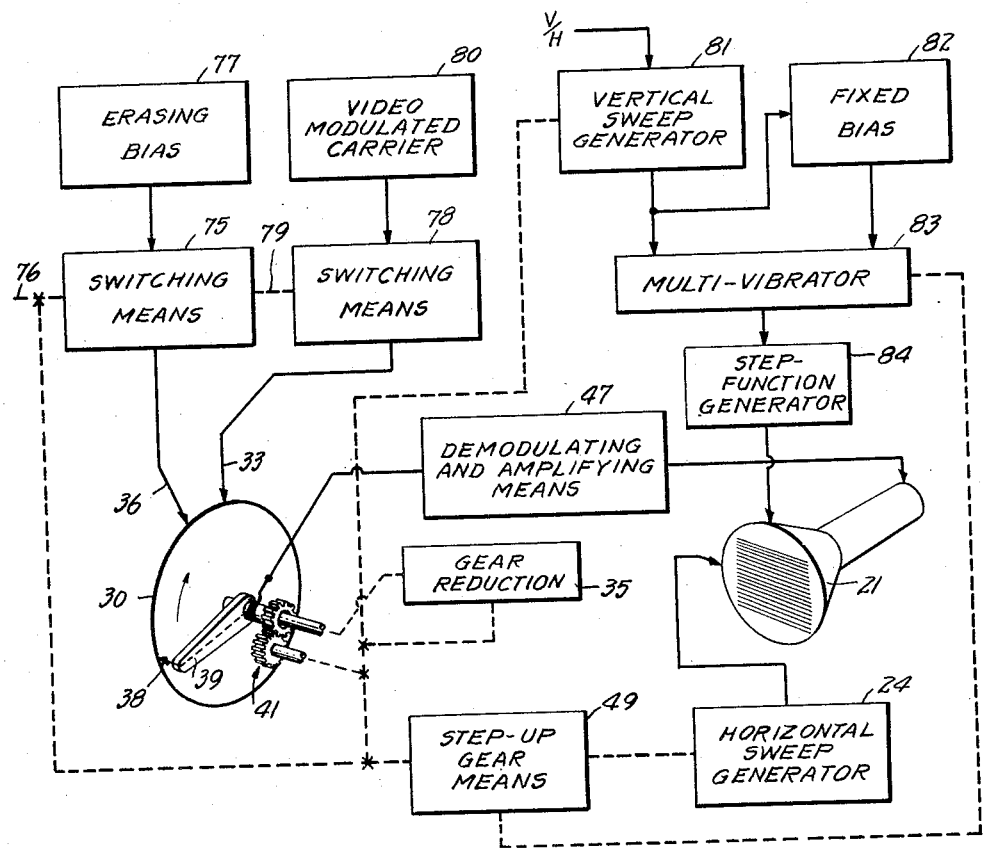
Fig. 5 is an electrical block diagram illustrating further alternative components for the device of Fig. 1.

Figs. 7, 8, and 9 are simplified diagrams illustrating variations of a further alternative; and Fig. 10 is a view of a cathode-ray-tube face with markings illustrating the operation of the device of Fig. 9.

Briefly stated, my invention contemplates the employment of a data-storing device capable of handling a sufficient number of successive scanned lines of video intelligence to produce a display frame. The arrangement of the storage device is such that it will always store the latest full frame of intelligence, commencing always with the latest developed scan line and extending always for the full number of lines per frame. The storage device may include a ring or endless loop of storage material, such as magnetic wire or tape, and a recording head, said ring (or loop) and head being movable relatively to each other at a rate which permits development of a full (stored) frame of intelligence over the full periphery of the ring (or loop). Erasing means may be provided adjacent the recording head, so that the frame of intelligence is maintained or remembered until the last possible instant, at which time only the oldest line is erased. Pickup means forming part of a frame scanner may scan the stored frame at a rate substantially exceeding the first rate of relative rotation, and preferably at least once for each new line of scan information. Display means properly synchronized with the frame scanner may thus continuously present the latest developed frame and, if some function is moving across the scanned frame, or if the frame itself is moving, then the display may follow such movement and may present the movement with respect to the instantaneous axis of the scanner.

In the forms to be described, the storage device comprises a continuously rotated ring or loop of storage material, and the recording head is either fixed or limited to relatively small movement; on the other hand, the pickup head or frame scanner is driven at a relatively high speed. In one form, the recording ring (or loop) records both the directly utilizable intelligence and the non-utilizable intelligence, and blanking means synchronized with the scanning of the storage device are relied upon to reject non-utilizable intelligence so as not to corrupt the display. In another form, means are provided for periodically indexing the recorder head during the dead-time intervals and in a manner to produce no stored record during such intervals, so that the full periphery or storage capacity of the ring may be utilized for recording substantially only the utilizable intelligence developed by the scanner. In still another form, commutating means are employed to control the function of a recording head and of an erasing head in such a manner as to interlace all periods of utilizable intelligence for a full utilization of the storage potentiality of the ring. In another general form, a plurality of fixed pick-up heads are spaced along the recording ring or loop, and an electronic switch or commutator scans these heads at high speed to develop an entire frame of video intelligence at least once for each new scan line that is recorded.

Referring to Fig. 1 of the drawings, my invention is shown in application to line-scanning means of the type disclosed in greater detail in the above-mentioned patent application. Such scanning means may comprise a support 10 fixedly carrying energy-responsive means 11. Collecting optics, including a plurality of mirrors 12—13—14 may be mounted on a scanner ring or drum 15, journalled (by means not shown) in the support 10 for rotation about and focussed on the energy-responsive means 11. Peripheral gear means 16 may be driven by a motor 17 to produce continuous unidirectional scanning action. For the configuration shown, that is, with three collecting mirrors spaced equally about the scanning axis, the angular field of view for directly utilizable intelligence is substantially sixty degrees, and a peripheral shield 18 carried by the support means 10 may serve to screen the scanner from energy not needed for coverage of the optically scanned field.

It is a property of scanners of the character indicated that about fifty percent of the full scanning cycle produces directly utilizable intelligence, but the remaining fifty percent of such cycle is consumed in getting each successive optical system into the field of view and out of the field of view, all as more fully explained in said application. As also pointed out in said application, scanners of the character indicated may be employed as aids for aerial reconnaissance, and, in such case, the scanned field of view is preferably generally downward, with the scanning axis substantially aligned with the flight axis; in some cases, it is desirable that the scanner shall look forward or backward of the vertical and, therefore, I schematically indicate at shaft 19 that the support 10 may be tilted about a pitch or elevation axis, as through motor and gear control means 20.

As further pointed out in said application, display means, which may include a cathode-ray oscillograph 21, may develop a frame presentation for a plurality of successive scan lines developed by the described scanner, relying on the persistence characteristics of the tube 21 to preserve the frame development. In such case, suitable signal-processing means, including amplifying means 22, may respond to the output of the energy-responsive means 11 to provide signals for intensity modulation (at 23) of the tube 21. Horizontal sweep signals may be provided by a generator 24, and vertical sweep or step-function signals by a generator 25, the horizontal sweep being synchronized with the line-scanning frequency and the vertical sweep amplitude being governed by the velocity-altitude function (hereinafter called $V/H$ rate) of the aircraft, as suggested at 26. In the event that the scanning head is trained in pitch during development of such a frame on the display means 21, the pitch position may be translated to the sweep generator, as suggested by the dashed line 27, to provide the necessary corrections in vertical-sweep or scan-depression amplitude.

For some purposes, the difficulty with the arrangement thus far described has been that the frame display at 21 is developed on a line-by-line basis, that is, each scan line placed on the face of the tube 21 occurs at substantially the same instant as the scan line is developed by the rotary scanner. Such scanned line will, therefore, be displayed at a fixed position on the face of the tube 21, and the next scan line must be displayed a given vertical separation from the first scan line. When all the lines have been displayed for a given frame, the latest line is at the end of the frame, and a new frame must be commenced at the opposite side of the display. The described operation results in intermittent presentation of relatively widely spaced frames, and each line of scanned intelligence is only presented once. Such line, once presented, may be preserved by the persistence characteristics of the tube face, but it is necessary to index one's reference for interpretation of the frame, for each successive frame presented.

In accordance with the invention, I obviate the described difficulties of the previous arrangement by employing a storage device which will always remember the intelligence developed in all the line scans of the latest frame, and I continuously scan such latest frame in order to present in effect a moving picture, rather than successive "still" frames on the face of the tube 21.

In the form shown, the storage device comprises a ring (or loop) 30 of energy-storing material, such as magnetic tape or wire, which may be formed on or carried by suitable supporting means, such as the flange 31 of a disc or wheel or drum 32. Recording-head means for applying intelligence to the ring 30 may be of known configuration and is merely schematically indicated at 33. The ring 30 and recording-head means 33 may be relatively rotated at a rate permitting development of all scan lines for a single frame on the periphery of the ring, and, in the form shown, the recording head 33 is fixed, while a shaft 34 continuously drives the wheel or support 32 for the ring 30. To maintain synchronism with the rotation of the scanner, I have schematically indicated gear-reduction means 35 coupling the shaft 34 to the basic scanner drive 17. In order that the storage means 30 shall always present a clean background against which a recording is made, I have indicated an erasing head 36 fixedly spaced in relatively close adjacency to the recording head 33 and, therefore, rotatable relatively to the ring 30; a steady bias, suggested at 37, may provide the necessary energy supply to the erasing head 36, and it will be understood that the spacing between the erasing head and the recording head may be insignificant enough as not to impair the ability of the ring 30 to store all the desired lines in a frame of intelligence.

In order to scan the stored frame of intelligence, I may employ a movable pickup head 38 which is shown mounted on an arm 39 rotatable independently of the ring 30, and preferably at a rate substantially exceeding that of ring 30, as, for example, once for every scan-line development in the frame and, therefore, faster than the rate of rotation of ring 30 by a factor corresponding substantially to the number of lines per frame. The arm 39 is shown concentric with the shaft 34 and may be driven by an independent scanning motor 40 and associated gearing 41. If desired, synchronism may be maintained between the scanning drive for arm 39 and the drive for the rotary scanner 15, as suggested by the dashed-line connection 42. Electrical pickoff of the energy detected by the head 38 may be made by means of slip-ring connection means 43 on the hub of arm 39, for supply to suitable signal-processing means and for ultimate intensity-modulation of tube 21 at the grid 23.

Because the frequencies characterizing the video intelligence developed by some forms of scanner of the character indicated may include relatively low-frequency components for which the material of the storing means 30 may not be best adapted, I illustrate my preference for applying the video intelligence as a modulation on a raised carrier frequency, as provided by a local source 45 through modulating means 46. The video-modulated carrier will then be impressed on the storage ring 30 at a frequency best adapted to the peripheral speed of the storage material with respect to the recording head, so that minimum loss of fidelity occurs in the transcription process. The energy collected by the pickup head 38 and picked off through slip rings 43 will thus also be video-modulated carrier, and I show further signal-processing means including demodulating and amplifying means 47 for eliminating the carrier so as to apply video intelligence to the intensity modulation of the display.

It will be recalled that, because of limitations attributable to the scanner 15, the demodulated video signal will include both the directly utilizable intelligence and the non-utilizable intelligence developed during the dead time of the scanner 15. In order that the undesired fraction of the video signal shall not corrupt the display, I indicate generally at 48 that blanking means synchronized with the basic scanning operation may be employed for the injection of a blanking bias on the video signal during the so-called dead-time intervals, so that only desired directly utilizable intelligence is impressed upon the display.

As indicated generally above in reference to the forms shown in the said copending application, it has been the practice to key the horizontal-sweep generator 24 to the line-scanning frequency of the scanner 15, but, of course, since the scanning frequency for the display means 21 depends on the rate at which the arm 39 scans the accumulation of lines stored on the ring 30, I have indicated that through suitable step-up gearing 49 the horizontal-sweep generator may be properly keyed to the scanning of lines in the storage device. By the same token, the vertical sweep should also be keyed to the basic frame rate in the storage device and I suggest, by means of dashed line 50 that this synchronism may be achieved by direct connection to the shaft 34. In spite of this synchronizing for the vertical-sweep generator, the amplitude of vertical sweep preferably still reflects the basic $V/H$ rate of the aircraft (in the case of aerial-reconnaissance applications) or the rate of scan depression through the pitch control 20 (for certain other applications, as discussed in my copending application, Serial No. 339,701, filed March 2, 1953). I have, therefore, retained the designations 26–27 to indicate the desirability of these additional functions on the vertical sweep, whereby both coordinates of the display frame may be properly scaled.

In operation, the scanner 15 will function as described in detail in the said copending applications, in other words, signal-processing means 22—46 will receive successive lines of scanned intelligence at a rate best suited to the response of the detector 11 and to the application requirements. The successive scanned lines will be applied in the form of video-modulated carrier to continuously fill virtually the entire periphery of the storage ring 30 and, at any one instant of time, the number of scanned lines on the ring 30 will reflect a full frame of intelligence. This full frame of intelligence will, therefore, always be a varying full frame; in other words, as each successive line is added to the full frame, the most remotely (or oldest) developed line will be dropped from the frame by means of the erasing head 36. However, the frame which instantaneously exists on the ring 30 may be scanned as often as desired, and I indicate my preference that this rate of scan of the entire frame retained by the ring 30 shall be at least once for every line scan. I indicate by means of directional arrows applied to the wheel 32 and to the arm 39 that I prefer to rotate the scanning arm 39 counter to the direction of rotation of the storage wheel, thereby minimizing the angular loss of capacity occasioned by the separation of the erasing and recording heads 36—33. The net result of scanning at the rate indicated will be to present a completely developed new frame on the face of the tube 21, once for every line of scanned intelligence that is developed. This will mean that a given line in the display will appear to migrate down the face of the tube 21 at a rate corresponding to the $V/H$ rate of the aircraft, or to the scan-depression rate of the support 10, as the case may be, and the effect will be one of continuously viewing a complete scanned field which is constantly aligned with the viewing axis of the scanner 15.

In the forms of Figs. 2–4 and 5–6, I illustrate two methods for more fully utilizing the storage potentialities of the ring 30, by applying to the ring 30 substantially only the directly utilizable intelligence, that is, to the exclusion of the non-utilizable intelligence which develops during the dead time of the scanner 15. In Figs. 2 and 3, this result is accomplished by an intermittently indexing mechanical mechanism, employing two counter-rotating parts 55—56, which are in the nature of flywheels, to which a movable recording head 57 is to be alternately clutched. The recording head 57 may be carried at the end of an arm 58, free on the end 34' of the drive shaft 34. The discs or flywheels 55—56 may be counter-rotated through beveled pinions 59—60—61, the center pinion 60 of which may rotate on an axis referenced to the frame, as suggested at 62. The stored intelligence may be scanned or picked up, as before, by means of pickup head 38 carried at the end of a scanning arm 39 and driven by gear means 41.

The intermittent clutching of pickup arm 58 to one or the other of the flywheel discs 55—56 may be achieved through electromagnetic clutches shown best in Fig. 3, the clutch 64 serving to lock the arm 58 to the wheel 55 when energized, and the clutch 65 serving to lock the arm 58 to the recording wheel 56 when energized. Limit switches 66—67 may be secured at fixed locations and with their actuating arms poised to intercept the arm 58 at its limits of travel. Thus, and referring particularly to Fig. 4, it will be seen that when the arm 58 strikes switch 67 (so as to close switch 67 and, through hold-in coil 67' to maintain switch 67 closed), the coil for clutch 64 will be energized, and the coil for clutch 65 will be deenergized; this will result in clutching arm 58 to the flywheel 55 and translating the recorder head 57 relatively to the storage ring 30, during a recording interval which may be equal to the period of the directly utilizable line scan. I indicate, by means of an additional set of contacts 68 associated with switch 67, that an on-off control 69 may be actuated to govern the supply of video-modulated carrier to the recording head 57 during this desirable recording interval, that is, once for each directly utilizable scan.

At the end of the directly utilizable scan line, arm 58 will be intercepted by switch 66 so as to energize clutch 65 and to deenergize 64, thus activating hold-in coil 66' and freezing the recorder head relatively to the storage ring 30 during the dead time of the optical scanner. At the end of the dead time, the arm 58 will have been carried back to the switch 67, at which time the clutching functions are reversed, and another directly utilizable scan line may be applied to the storage ring 30 immediately adjacent the termination of the previous scan line. The cycle will repeat for each successive scan line and the storage ring 30 may thus be loaded up substantially only with directly utilizable intelligence and may thus be employed to its fullest advantage. For the direction of rotation indicated by the arrows in Fig. 2, the erasing function may be governed by a stationary head 70 immediately adjacent the switch 66, as will be understood.

The sweep generator treatment for the display means utilizing the information scanned by the device of Figs. 2, 3, and 4, may generally resemble that described in connection with Fig. 1, and the ultimate display will have the same character. Naturally, however, there will not be the need to employ as great a blanking period at means 48 as described for the case of Fig. 1, because the transfer from scan line to successive scan line is substantially an instantaneous transfer, and blanking may, therefore, serve only to eliminate the display of transients associated with transfer from line to line.

Figure 6:
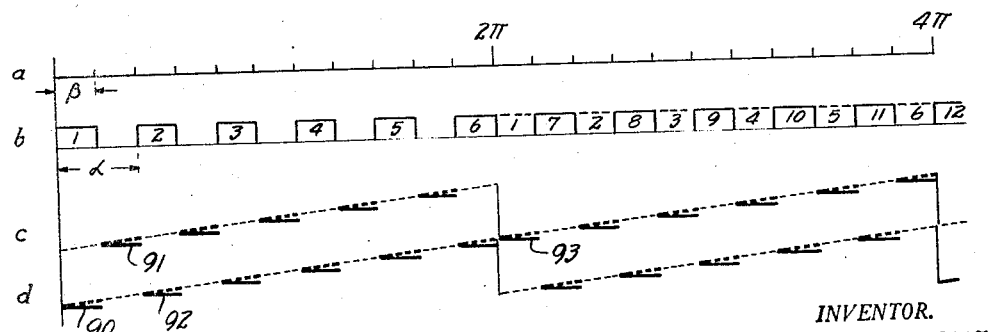
Fig. 6 is a graphical representation of function coordination in the circuit of Fig. 5.

In the form illustrated in Figs. 5 and 6, I achieve substantially complete utilization of the storage ring (or loop) 30 without resort to special mechanical indexing means. This result is achieved (1) by so relating the drive speed for the storage ring 30 to the basic scanning frequency that an odd number of directly utilizable scan-line intervals occupies the full periphery of the scanning ring 30 and (2) by blanking the video signal impressed on the recording head 33 during the full dead-time intervals of the scanning 15. I also provide control over the erasing function at the head 36, so as to provide intermittent erasing only of the oldest scan line in the instantaneously developed frame; this calls for an angular separation α (see Fig. 6) between the recording and erasing heads, such separation being substantially equal to an integer multiple of the basic period of the scanning frequency, and preferably equal to such period. Since this period α represents the sum of the directly utilizable scan-line period and the dead-time period, it may be considered to be twice the directly utilizable period β; but, in accordance with the invention, the capacity of the ring 30 may, nevertheless, be $$\frac{2\pi}{\beta}$$

lines per frame, as long as $$\frac{2\pi}{\beta}$$

is an odd number.

The components for developing the continuous utilization of ring 30 in Fig. 5 may include switching means 75 synchronized, as suggested by the dotted lines 76, with the basic scan rate (as developed by motor 17 of Fig. 1), and governing the alternate application and removal of erasing-bias signals developed at 77 for application to the erasing head 36. In like manner, therefore, switching means 78 may also be synchronized as suggested at 79 with the basic optical-scanner rate in order to control the intermittent application of video-modulated carrier available at 80 for supply to the recording head 33.

Referring to curves $a$ and $b$ of Fig. 6, it will be seen that, commencing at the origin indicated, and for a first full revolution of ring 30 (designated $2\pi$ in the diagram), video-modulated intelligence will be applied intermittently to the storage ring 30 for the successive periods designated 1—2—3 . . . 6, there being between periods 1—2—3 . . . 6 blanking intervals in which no intelligence will be applied to the ring 30. For the next revolution ($2\pi$ to $4\pi$), the scan lines recorded during the first revolution will remain on the storage ring 30, and the blanks will be filled in by the further scan lines designated generally 7—8 . . . 11, thus completely filling the storage ring 30 with directly utilizable intelligence; as previously noted, the stored intelligence represents an odd number of lines per frame, which, in the simplified assumed case, is 11 lines. By virtue of the described placement of the erasing head with respect to the recording head, it will be understood that the oldest scan line in the instantaneously available frame on the storage means 30 will always be erased just before the newest line is to be applied.

Naturally, the described loading of the storage ring 30 results in a shuffled or interlaced succession of scanning lines, so that the scanning arm 39 will trace the odd succession indicated by the numerical sequence between $2\pi$ and $4\pi$ in Fig. 6b. The display means must, therefore, decipher this interlaced scanning for properly correlated display on the face of tube 21. The deciphering need involve no particular change in the demodulating and amplifying means 47, or in the horizontal sweep 24, already described, but certain precautions must be taken in the provision of vertical sweep voltages.

For the arrangement shown, I have employed two vertical sweep generators 81—82, which may be identical, and which may both be synchronized (as suggested by dotted interconnections) with the basic rotation of the scanning arm 39. Because the outputs of generators are, in the form shown, characterized by the same envelope spaced by a constant voltage, I have shown the use of a single generator 81 to derive the basic sweep envelope, and the use of a fixed biasing means 82 to develop the second sweep voltage from the output of generator 81. Thus, curve $c$ of Fig. 6 may designate the sweep output of generator 81, and curve $d$ of Fig. 6 may designate the sweep output of generator 82.

For correlated application of the outputs of both vertical sweep generators 81—82 to the deflection control of tube 21, I employ commutator means 83 which, for simplicity, may be a multivibrator or flip-flop circuit, accepting the respective sweep-generator outputs and synchronized with the horizontal sweep rate (at a multiple depending on the number of lines per frame) to alternate the supply of the respective vertical sweep voltages for control of the display; if desired, and to maintain a more pleasing display, a step-function generator 84 may hold given vertical deflection voltages throughout each horizontal sweep, thus avoiding the appearance of a "crabbing" or warped horizontal sweep base. Thus, for the period during which the first scan line of curve $b$ is being scanned by the pickup head 38, multivibrator 83 may channel the output of generator 81 to determine (through step-function generator 84) a first vertical deflection voltage 90 for the display at 21. During the next and succeeding blank periods of the first full revolution (0 to $2\pi$), there will be no intensity modulation; however, it will be understood that when the frame scanner 39 has recycled ($2\pi$ to $4\pi$, and thereafter), such blank periods would have contained scan lines in the positions numbered 7—8 . . . 11, and that multivibrator 83 will (in the case of the number-7 position) have channeled a voltage determining the deflection level 91, for a proper placement of such number-7 scan on the display. The next scan line applied to storage means 30 will be the number-2 scan line, and multivibrator 83 will rechannel generator 81 to the display 21, so as to determine another deflection voltage 92, appropriate to the number-2 scan-line position in the display. Similar alternations will continue for successive interlaced scan lines, and upon completion of a full revolution of the storage wheel 30, the number-1 line will be rescanned by the pickup 38. However, inasmuch as one revolution has taken place since the number-1 line was placed on the storage device, its proper position in the display will have migrated substantially the length of the display; and, as will be seen from curve $d$ of Fig. 6, the first occurrence of this scan line in the second revolution of its existence on the storage device 30 will be governed by deflection voltage 93, as channeled from and determined by the second sweep generator 82.

After the first scan line has been on the storage device 30 for substantially two full revolutions thereof, that is, when it has achieved the number-11 position shown in curve $b$ of Fig. 6, the erasing means 36, under control of switch 75, will erase this first scan line, which by then will have become the oldest scan line remembered by the storage device, but which by then will have been scanned by the pickup head 38 at least ten times. For each of these ten scans of the same scan line, its placement in the ultimate display will have been indexed down one vertical position until the line eventually disappears out of the instantaneously displayed frame.

In Figs. 7, 8, and 9, I illustrate another general form of the invention in which an entire frame of scan lines is continuously available for high-speed scanning, as by electronic means. The ring or loop of storage material may be an endless belt of flexible magnetic wire or tape, and the various lines in the frame to be scanned may be continuously available for high-speed frame-scanning by providing one pick-up element for each scan line in the frame, the pick-up elements being spaced along the loop of storage material by amounts appropriate to the time-spacing of scanning lines developed by the optical scanner, such as the scanner 15 of Fig. 1.

In the form of Fig. 7, what would otherwise be mechanically bulky equipment may be compressed into more convenient dimensions by having the endless loop 100 of storage material completely accommodated as a helical development on the periphery of a drum or storage cylinder 101, the loop being completed by a convenient employment of external pulleys, as schematically suggested; loop 100 may be driven by motor means 102 synchronized (by means not shown) to the optical-scanner drive 17. For the direction of rotation suggested by the arrow at the end of cylinder 101, the storage material 100 enters the drum 101 at a recording head 103, at which point the fresh optically-scanned intelligence, which may be in the form of video-modulated carrier available from circuit means 104, is impressed upon the storage drum. The diameter and speed of the drum are preferably so related to the optical-scanning speed that a full line-scanning cycle is stored in a single turn (or integer multiple of turns) of the tape or wire 100, as developed along the drum 101. A first pick-up head 105 may be fixedly supported adjacent the wire or tape 100 at a first pick-off point representing a delay equal to one line-scanning cycle of the optical scanner, and in like manner, other pick-up heads 106—107 . . . 108 may be fixedly supported at further correspondingly delayed points along the helical progression. An erasing head 109 may erase the stored intelligence on wire or tape 100 just before application of the video signal at 103.

With the described storage drum and multiple pick-off elements, it will be appreciated that drum 101 may always contain the latest full frame of optically scanned intelligence, and that the output lines associated with the various pick-off heads 105—106 . . . 108 may always present properly correlated stored video for transcription into the several lines of such frame. I have shown commutator means 110 for accepting the several outputs of the pick-up elements and also for directly accepting at 111 the video-modulated carrier representing the instantaneously developed (and hence, undelayed) latest line of scanned intelligence.

The commutator may be mechanical, but I prefer that it shall be a high-speed electronic switch, sampling the respective inputs at a rate substantially exceeding the line-scanning frequency, and providing in an output line 112, a single time-multiplexed video-modulated carrier for further processing, as at demodulator 113, to derive the video signal for intensity modulation of the display tube 114. In order to provide beam-deflection control appropriate to the intensity modulated signals impressed on tube 114, I show a horizontal sweep generator 115 synchronized (by means 116) with the basic scanning frequency, and a vertical-deflection step-function generator 117 synchronized with commutator operation. The net result of the control afforded by deflection circuits 115 and 117 will be to develop an entire frame of displayed information once for each new optically scanned line. If desired, manual or automatic means may be employed at 118 to introduce a proper change in the magnitude of function steps in generator 117 to take into account vertical-scale effects appropriate to the scan-depression rate, or to the $V/H$ rate of the aircraft (in the case of aerial reconnaissance).

In Fig. 8, I show a slight modification of a part of the device described in Fig. 7, whereby storage tape 120, accommodated on the storage drum 101, may accept a plurality of channels of video signals, as developed from a multiple-element scanner of the type described in the above-identified Blackstone-Willey application. In the event that the energy-responsive means 11 includes two cell elements, it is desirable to record both video channels simultaneously on the tape 120, and I have schematically indicated that separate recording heads 121—122 may accept (from circuits 123—124) the signals separately identified with each energy-responsive cell, for side-by-side recording on the tape 120. As in the case of Fig. 7, pick-up means may be provided at appropriately delayed points along the helical development of the tape 120, and since two channels are recorded simultaneously, the pick-up elements 125—126 . . . 127—128 are provided in duplicate and are all separately connected to the multiple inputs of commutator means 110'. Ordinarily, and as in the case of the multiple-channel scanners described in said Blackstone-Willey application, each sensitive cell in effect scans a different line in the field of view and, depending upon the $V/H$ rate or the scan-depression rate as the case may be, it may be desired that the commutator 110' shall sequence the signals at 121—122 immediately adjacent those at 125—126. Alternatively, and depending upon the geometry and timing of the system, commutator 110' may be called upon to interlace the switching-sequence functions applied to these and to corresponding signals in order to develop a meaningful display, all as will be understood.

In Fig. 9, I show a further variation of the arrangement of Fig. 7 in which scanning of the stored frame is performed more often than once per line-scanning cycle. The storage drum 101 may accommodate a helical progression of flexible storage material 100, and video-modulated carrier available at 130 may be impressed on the storage drum at 131 and on the commutator 132 at 133. Pick-off elements 134—135—136 may be spaced in accordance with the delay between line scans and provide outputs to successive channels of commutator 132, all in accordance with the description for Fig. 7. In addition, in Fig. 9, I show that a further set of pick-off elements 131—134 . . . 136 and may, therefore, supply a placed relation with the elements 131—134 . . . 136, and for the configuration shown, the two sets of elements are 180 degrees apart. The elements 137—138 . . . 139 will be understood to develop line intelligence for a second frame interlaced with the frame developed by elements 131—134 . . . 136 and may, therefore, supply a separate commutator 140 having an output which may be multiplexed, as by means of a flip-flop or double-throw switching circuit 141, with the output of commutator 142.

I have suggested by means of dashed lines 142 that the switching circuit 141 may be positively synchronized with rotation of drum 101, and the arrangements are preferably such that the output of commutator 132 is supplied to line 143 for the exact period in which a new useful scanning line of intelligence is being recorded at 131. Once the latest scan line has been recorded, circuit 141 disconnects output line 143 from commutator 132 and connects it (line 143) to commutator 140. The sweep and deflection circuits 144—145 for the respective axes of the display may be synchronized as previously described and may have step-function characteristics appropriate to the deciphering of the time-multiplexed video in line 143, as will be understood.

The ultimate display for the device of Fig. 9 will have the general appearance suggested in Fig. 10, in which for every new line of optically scanned intelligence, a full frame is displayed, as on the horizontal axes designated in full lines. Alternately, and interlaced with such displays, further displays may be produced on the horizontal axes designated by dashed lines, thus filling in spaces between display lines and presenting a more readily interpretable overall display. The net result will be to produce two interlaced frame displays for every line-scanning cycle of the optical scanner, and these two displays will be appropriately depressed with respect to each other in accordance with the scan-depression rate of the optical axes or with the $V/H$ rate of the aircraft, depending upon the application.

It will be seen that I have described novel and useful mechanisms for greatly extending the utility and interpretability of line-scanning devices of the character indicated. The improvement effected by my devices is in the nature of the improvement difference between slide-picture projection and moving-picture projection, for the displayed intelligence will continuously produce the effect of movement within or movement of the scanned field, and there will be no apparent shutter-indexing action as long as there is a sufficient number of lines per frame, and as long as the full frame of storage information is scanned at least as fast as the line frequency.

While I have described my invention in detail for the preferred forms shown, it will be understood that modifications may be made within the scope of the invention as defined in the claims which follow.

I claim:

1. In a scanning mechanism of the character indicated, line-scanning means producing a video output signal, frame-storing means comprising a continuously rotated ring of magnetizable material synchronized with the line-scanning frequency and driven at a reduced rate relatively to the line frequency, recording-head means responsive to said signal and in recording relation with said material, whereby a plurality of successive scanned lines of said video signal may be stored by said material, pick-up head means mounted for rotation about the axis of said ring, means driving said pick-up head means at a rate substantially faster than said reduced rate, and display means having a recycling period synchronized with the rate of rotation of said pick-up head means and including intensity-modulation means responsive to the output of said pick-up head means.

2. In a scanning mechanism of the character indicated, line-scanning means producing a video output signal, a ring of magnetizable material, recording-head means responsive to said signal and in recording relation with said material, means driving said ring and said recording-head means for relative rotation at a reduced rate synchronized with the line-scanning frequency, whereby a plurality of successive scanned lines of said video signal may be stored by said material, pick-up head means in scanning relation with said ring, means driving said pick-up head means and said ring for relative rotation about the axis of said ring and at a rate substantially faster than said reduced rate, and display means having a recycling period synchronized with said last-defined rate of rotation and including intensity modulation means responsive to the output of said pick-up head means.

3. A mechanism according to claim 2, and including erasing means for erasing a signal stored on said ring and fixedly mounted with respect to said recording-head means.

4. In a scanning mechanism of the character indicated, a scanner comprising a plurality of optical elements spaced about an axis of rotation, fixed energy-responsive means responsive to energy collected by said optics, drive means for continuously rotating said scanner, a ring of magnetizable material, recording-head means responsive to the output of said energy-responsive means and in recording relation with said material, drive means for rotating said recording-head means and said ring continuously and relatively to each other at a reduced rate synchronized with rotation of said scanner, whereby a plurality of successive scanned lines of the output signal of said energy-responsive means may be stored by said material, pick-up head means in collecting relation with said material, means driving said pick-up head means and said ring relatively to each other about the axis of said ring and at a rate substantially faster than said reduced rate, and display-means having a recycling period synchronized with the rate of rotation of said pick-up head means and including intensity-modulation means responsive to the output of said pick-up head means.

5. In a scanning mechanism of the character indicated, line-scanning means for producing a video output signal, modulator means including a carrier-frequency source for producing a video-modulated carrier, a ring of energy-storing material, recording-head means responsive to said video-modulated signal and in recording relation with said material, drive means for rotating said recording-head means and said ring relatively to each other about the axis of said ring and at a reduced rate synchronized with the line-scanning frequency, pick-up head means in detecting relation with said ring, means driving said pick-up head means and said ring relatively to each other about the axis of said ring and at a rate substantially faster than said reduced rate, and display means including demodulator means for the picked-up video-modulated carrier, said display means having a recycling period synchronized with said last-defined rate of rotation, said display means further including intensity-modulation means responsive to the output of said demodulator means.

6. A mechanism according to claim 5, in which said display means includes a cathode-ray oscilloscope, deflection means for said oscilloscope, comprising one component synchronized with said recycling period and therefore with the frame frequency, and a second component recycling at a faster rate than said one component substantially by a multiple representing the number of lines per frame.

7. In a scanning mechanism of the character indicated, a scanner including a support, energy-responsive means fixedly carried by said support, an optical system journalled on said support and rotatable about said energy-responsive means, whereby energy collected by said optics and scanned during rotation thereof may be focused on said energy-responsive means, energy-storing means responsive to the output of said energy-responsive means and continuously storing a plurality of successive line scans, means continously scanning said storing means at a rate substantially exceeding the line-scanning rate, and display means including a cathode-ray oscilloscope intensity-modulated by the scanned output of said storage device, a first sweep generator for control of one deflection component of said oscilloscope and synchronized with the line-scanning frequency, whereby said first sweep generator may develop a sweep signal at the frame frequency, and a second sweep generator for control of the other deflection component of said oscilloscope and synchronized with the frequency of said first sweep generator but at a multiple thereof corresponding to the number of lines per frame.

8. A scanning mechanism according to claim 7, and including scan-depression means for inclining said support about an axis generally transverse to the scanning axis, and amplitude-control means for said second sweep generator and responsive to the rate of scan-depression, whereby the display may portray two properly scaled components of a scan frame.

9. A scanning mechanism according to claim 7, in which said support is relatively fixedly mounted in an aircraft with the scanning axis generally aligned with the axis of flight, whereby successive line scans may be transverse to the direction of flight, and in which said second-mentioned sweep generator includes amplitude-control means responsive to the velocity-altitude function of the aircraft, whereby the displayed frame of scanned intelligence may be properly scaled for both coordinates of the display.

10. In a device of the character indicated, a continuously driven rotary scanner with energy-responsive means responsive to energy collected by said scanner for successive lines of scan, said scanner including a plurality of optical elements successively focused on said energy-responsive means, whereby for one rotation of said scanner substantially fifty percent of the rotation may produce directly utilizable scanned intelligence, energy-storing means responsive to the output of said energy-responsive means and having a storage capacity of a frame constituting a plurality of lines scanned by said scanner, said storage device including a loop of continuously moving storage material and relatively indexible recording and pick-up members, means for indexing said members with respect to each other during periods in which non-utilizable intelligence is being supplied and in a direction with respect to the movement of said storage material to produce substantially no record on said storage element, means for indexing said members in the opposite direction of relative movement during periods of utilizable intelligence, and display means including means for scanning all the stored intelligence at a rate at least as fast as the line frequency of said rotary scanner.

11. As an article of manufacture, an energy-storage device for continuously recording and picking off a plurality of successive line scans of video signal to be recorded, comprising two counter-rotating revoluble elements with common drive means therefor, and a ring of energy-storing material on one of said elements, a recording-head member rotatably mounted with respect to both said elements and in recording relation with said ring of storing material, means for selectively clutching said recording head to be carried for rotation with one or with the other of said counter-rotating elements, means synchronized with the line-scanning rate of a video signal for alternately energizing said clutches, and means for scanning all the stored intelligence on said ring at a rate at least as fast as the line frequency of said video signal.

12. A device according to claim 11, in which said synchronizing means includes two fixed limit switches angularly spaced about the axis of said ring by an amount corresponding substantially to $2\pi$ divided by the number of lines per frame and in intercepting relation with said recording-head member, whereby said head member may shuffle between the limits defined by said switches.

13. In a scanning device of the character indicated, line-scanning means having a roughly equal division between directly utilizable line scans and dead time, frame-storing means comprising an endless loop of energy-storing material and having the capacity to store enough line scans to complete a frame, recording-head means responsive to the output of said scanning means, means for continuously driving said loop and said recording-head means relatively to each other at a rate synchronized with the line-scanning frequency, erasing-head means fixedly mounted with respect to said recording-head means and spaced from said recording-head means along said loop by an amount representing twice an odd-integer submultiple of one cycle of said relative movement involving the full peripheral traversal of said loop, whereby at said rate of relative movement said spacing may represent one full line-scanning cycle including both the directly utilizable intelligence and the dead-time portion thereof, switching means for both said erasing-head means and said recording-head means and synchronized with the line-scanning frequency and operable during the directly utilizable interval of said scanning cycle, whereby a full frame of intelligence may be stored on said loop in two complete peripheral traversals of said loop, and means for scanning all the intelligence stored on said loop at a rate at least as fast as the line frequency of said line-scanning means.

14. A device according to claim 13, in which said last-defined means includes commutator means for correlating alternate successive lines in the scanned stored intelligence.

15. A device according to claim 14, and display means including a cathode-ray oscilloscope including two vertical sweep generators producing like sweep voltages of twice the repetition frequency of scanning the stored intelligence, but in 180-degree phase-displaced relation with each other, said commutator means including a multi-vibrator commutating the outputs of said sweep generators in alternation to one deflection circuit of said oscilloscope, whereby said commutator means may serve to interlace the lines scanned successively by said stored-intelligence scanning means.

16. As an article of manufacture, an energy-storage device for continuously recording and picking off a plurality of successive line scans of a video signal to be recorded, comprising an endless loop of energy-storage material, recording-head means in recording relation with said material and responsive to said video signal, means for driving said storage material relative to said recording-head means at a rate synchronized with the line-scanning frequency of said video signal, said material being of a peripheral extent sufficient to accommodate at one time a plurality of scan lines of intelligence when driven at said rate, and means for scanning all the stored intelligence of said loop at a rate at least as fast as the line-scanning frequency of said video signal.

17. As an article of manufacture, an energy-storage device, comprising an endless loop of flexible magnetizable material and an elongated cylindrical support, a substantial part of said loop being helically developed along the periphery of said cylindrical support, means for guiding the remaining or return part of said loop, means for continuously rotating said cylinder, a magnetic-recording head in recording relation with said material near one turn of said helical progression, and a plurality of pickup heads in transcribing relation with said material at turns of said helical progression remote from said first turn.

18. An article according to claim 17, in which said magnetizable material is magnetic tape.

19. An article according to claim 18, in which said recording-head means includes two channels for side-by-side development on said tape of two independently recorded signals, and in which each of said pick-up heads is likewise characterized by two independent transcribing channels respectively aligned with the recorded channels on said tape.

20. In combination, means for producing a continuous video signal representing a plurality of successive line scans of intelligence, storage means comprising a continuously-driven helical development of an endless loop of storage material, recording head means in recording relation with said material at one turn thereof and responsive to said first-mentioned means, a plurality of pick-up heads in transcribing relation with said material at successively delayed turns of said helix, and scanning means for continuously scanning the intelligence stored on said helix and including a commutator responsive to the outputs of said pick-up heads and time-multiplexing said outputs in a single output line.

21. The combination of claim 20, in which the separation between recording and pick-up heads and the driving speed for said helix are such that the delay between successive heads corresponds to the line-scanning period of said first-mentioned means.

22. The combination of claim 20, in which the separation between recording and pick-up heads and the driving speed for said helix are such that the delay between successive heads corresponds to a submultiple of the line-scanning period of said first-mentioned means.

References Cited in the file of this patent

UNITED STATES PATENTS

| | | |
|---|---|---|
| 1,945,626 | Baird | Feb. 6, 1934 |
| 2,597,001 | Jaffe | May 20, 1952 |